United States Patent
Kumar et al.

(10) Patent No.: US 10,922,776 B2
(45) Date of Patent: Feb. 16, 2021

(54) PLATFORM FOR REAL-TIME VIEWS ON CONSOLIDATED DATA

(71) Applicant: Accenture Global Solutions Limited, Dublin (IE)

(72) Inventors: Ramya Kumar, Pune (IN); Sreyas Subramaniam Sankaranarayanan, Thiruvananthapuram (IN); Nitin Kumar Gupta, Ghaziabad (IN); Hemant Manaharlal Kakkad, Mumbai (IN)

(73) Assignee: Accenture Global Solutions Limited, Dublin (IE)

( * ) Notice: Subject to any disclaimer, the term of this patent is extended or adjusted under 35 U.S.C. 154(b) by 361 days.

(21) Appl. No.: 15/609,355

(22) Filed: May 31, 2017

(65) Prior Publication Data

US 2017/0352123 A1   Dec. 7, 2017

(30) Foreign Application Priority Data

Jun. 2, 2016  (IN) .............................. 201641018932

(51) Int. Cl.
| | |
|---|---|
| *G06Q 10/10* | (2012.01) |
| *G06Q 10/08* | (2012.01) |
| *G06Q 30/02* | (2012.01) |
| *G06Q 40/08* | (2012.01) |
| *G06Q 50/26* | (2012.01) |
| *G06F 16/9537* | (2019.01) |

(52) U.S. Cl.
CPC ....... *G06Q 50/265* (2013.01); *G06F 16/9537* (2019.01)

(58) Field of Classification Search
CPC .............. G06Q 50/265; G06F 16/9535; G06F 16/9537
USPC .......................................... 705/1.1–912, 325
See application file for complete search history.

(56) References Cited

U.S. PATENT DOCUMENTS

| | | | | |
|---|---|---|---|---|
| 8,954,514 | B2 * | 2/2015 | Gunasekara | .......... G10L 13/043 455/404.1 |
| 9,014,661 | B2 * | 4/2015 | deCharms | ............. H04W 4/021 455/404.2 |
| 9,466,199 | B2 * | 10/2016 | McNabb | ................. G06F 16/29 |
| 9,820,120 | B2 * | 11/2017 | deCharms | ............. H04W 4/021 |

(Continued)

*Primary Examiner* — Jonathan P Ouellette
(74) *Attorney, Agent, or Firm* — Fish & Richardson P.C.

(57) ABSTRACT

Implementations are directed to receiving a first set of event data from a first data source, the first set of event data including data representative of an occurrence of a real-world event, providing an event ticket, the event ticket including at least a portion of data of the first set of event data, transmitting presentation data to one or more computing devices, the presentation data being based on the event ticket and being processable by the computing device to display a real-time view including one or more graphical representations representative of the real-world event, receiving a second set of event data from a second data source, the second set of event data including data associated with the real-world event, revising the event ticket to include at least a portion of data of the second set of event data to provide a revised event ticket, and transmitting revised presentation data to one or more computing devices, the revised presentation data being based on the revised event ticket and being processable by the computing device to display a revised real-time view.

15 Claims, 7 Drawing Sheets

(56) References Cited

U.S. PATENT DOCUMENTS

| | | | |
|---|---|---|---|
| 2007/0216535 A1* | 9/2007 | Carrino | G06Q 10/10 340/573.1 |
| 2009/0299766 A1* | 12/2009 | Friedlander | G06Q 10/00 705/3 |
| 2011/0018998 A1* | 1/2011 | Guzik | H04N 7/18 348/143 |
| 2011/0117878 A1* | 5/2011 | Barash | H04M 1/72536 455/404.2 |
| 2011/0130636 A1* | 6/2011 | Daniel | B64C 39/024 600/301 |
| 2013/0183924 A1* | 7/2013 | Saigh | A61K 31/198 455/404.2 |
| 2014/0314212 A1* | 10/2014 | Bentley | H04M 3/5116 379/38 |
| 2015/0227999 A1* | 8/2015 | Maguire | G06Q 30/0611 705/80 |
| 2016/0284038 A1* | 9/2016 | Johnson | G06Q 50/265 |
| 2017/0193787 A1* | 7/2017 | Devdas | G08B 21/0446 |

* cited by examiner

PLATFORM FOR REAL-TIME VIEWS ON CONSOLIDATED DATA

CROSS-REFERENCE TO RELATED APPLICATION

This application claims priority to Indian Provisional Patent Application No. 201641018932, filed on Jun. 2, 2016, entitled "PLATFORM FOR REAL-TIME VIEWS ON CONSOLIDATED DATA," the entirety of which is hereby incorporated by reference.

BACKGROUND

Population centers, such as cities, are have a multitude of challenges in handling incidents, such as incidents impacting public health and/or safety. The quantum of incidents are testing limits of law enforcement agencies, utility services, and aid organizations. Different entities are finding ways to offer a credible response for city crimes, spread of epidemics, child support, or utility companies. Entities, such as public safety organizations, seek to respond to and resolve events (e.g., crime, accidents, and natural disasters) as quickly and efficiently as possible. In some cases, an entity may have little insight to details surrounding an event, which impedes situational awareness, and can result in non-optimized response.

SUMMARY

Implementations of the present disclosure are generally directed to providing real-time views on consolidated data. More particularly, implementations of the present disclosure are directed to a comprehensive platform that enables access to real-time visual and location-based information, and provides a holistic view to entities (e.g., public safety organizations).

In some implementations, actions include receiving a first set of event data from a first data source, the first set of event data including data representative of an occurrence of a real-world event, providing an event ticket, the event ticket including at least a portion of data of the first set of event data, transmitting presentation data to one or more computing devices, the presentation data being based on the event ticket and being processable by the computing device to display a real-time view including one or more graphical representations representative of the real-world event, receiving a second set of event data from a second data source, the second set of event data including data associated with the real-world event, revising the event ticket to include at least a portion of data of the second set of event data to provide a revised event ticket, and transmitting revised presentation data to one or more computing devices, the revised presentation data being based on the revised event ticket and being processable by the computing device to display a revised real-time view. Other implementations of this aspect include corresponding systems, apparatus, and computer programs, configured to perform the actions of the methods, encoded on computer storage devices.

These and other implementations can each optionally include one or more of the following features: the second data source includes at least one of a web service, a data service, a computer-implemented social networking service, and a search engine; the second data source includes a computing device of a user, the computing device executing at least a portion of a computer-implemented citizen connection service; the one or more computing devices includes a computing device of a responder that is being called to respond to the event; the real-time view depicts a map indicating a location of the real-world event, and at least one of a location of one or more responders to the real-world event, and a location of a witness that reported the real-world event.

The present disclosure also provides a computer-readable storage medium coupled to one or more processors and having instructions stored thereon which, when executed by the one or more processors, cause the one or more processors to perform operations in accordance with implementations of the methods provided herein.

The present disclosure further provides a system for implementing the methods provided herein. The system includes one or more processors, and a computer-readable storage medium coupled to the one or more processors having instructions stored thereon which, when executed by the one or more processors, cause the one or more processors to perform operations in accordance with implementations of the methods provided herein.

It is appreciated that methods in accordance with the present disclosure can include any combination of the aspects and features described herein. That is, methods in accordance with the present disclosure are not limited to the combinations of aspects and features specifically described herein, but also include any combination of the aspects and features provided.

The details of one or more implementations of the present disclosure are set forth in the accompanying drawings and the description below. Other features and advantages of the present disclosure will be apparent from the description and drawings, and from the claims.

DETAILED DESCRIPTION

Figure 1:
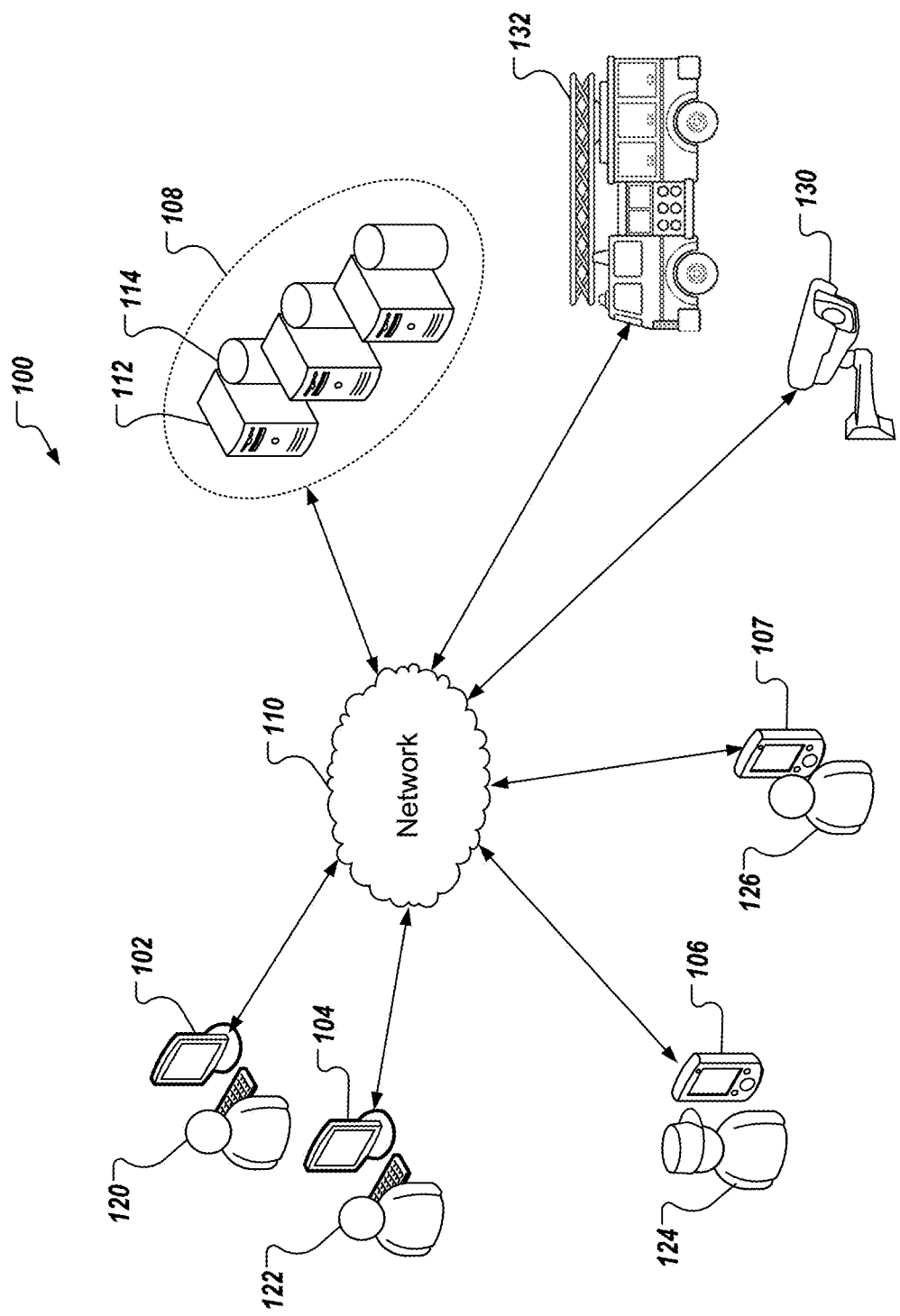
FIG. 1 depicts an example high-level architecture in accordance with implementations of the present disclosure.

Implementations of the present disclosure are generally directed to providing real-time views on consolidated data. More particularly, implementations of the present disclosure are directed to a comprehensive platform that enables access to real-time visual and location-based information, and provides a holistic view to entities (e.g., public safety organizations). In this manner, entities are able to make informed decisions and take responsive action, and are able to enhance safety and security.

As described in further detail herein, implementations of the present disclosure include receiving an initial set of event data from a data source. In some examples, the initial set of event data includes data representative of an occurrence of a real-world event. For example, the data can include descriptions of a crime, such as location, type of crime (e.g., theft), suspects, and can be provided by a witness/victim to/of the crime. In some examples, an event ticket is provided and includes at least a portion of data of the initial set of event data. Presentation data is transmitted to one or more computing devices, the presentation data being based on the event ticket and being processable by the computing device to display a real-time view including one or more graphical representations representative of the real-world event. In some examples, a subsequent set of event data is received from a second data source (e.g., the Internet, a web service), the subsequent set of event data including data associated with the real-world event. In some examples, the event ticket is revised to include at least a portion of data of the subsequent set of event data to provide a revised event ticket. Revised presentation data is sent to the one or more computing devices, the revised presentation data being based on the revised event ticket and being processable by the one or more computing devices to display a revised real-time view.

As described in further detail herein, implementations of the present disclosure address a need for real-time information and aggregation from multiple data sources, and provides enhanced situational awareness. Implementations of the present disclosure also support decision making through cognitive computing and analytics to provide intelligence to prevent and/or resolve events (e.g., crimes). Implementations also provide mobility that enables actors (e.g., police officers) to perform their duties based on context-appropriate, accurate, and real-time information that is provided at the right place, and at the right time. Implementations also include a social media listener that receives social media data (e.g., from a plurality of computer-implemented social media services) to identify trending topics, public sentiments, hot spots, and the like. Implementations further provide a computer-implemented citizen connection service (referred to herein as Citizen Konnect) that provides data views to users (e.g., citizens) to enable the user to make more informed decisions regarding safety, for example. In short, and as described herein, implementations of the present disclosure enhance standards (e.g., public safety standards) through smart integration of services (e.g., emergency services) with digital technologies and engaging actors (e.g., police officers, citizens) at each step.

Implementations of the present disclosure further provide integration with real-time web services (e.g., online resources that can provide relevant data regarding an event in real-time), asynchronous calls to request/receive real-time event details, and asynchronous status update of events. In some examples, and from a performance evaluation perspective, implementations of the present disclosure apply formulas for deriving cost of operations, and configurable rule sets for defining courses of action in response to particular inputs.

Implementations of the present disclosure address challenges posed in aggregating large amounts of data from multiple data sources, data being provided in disparate data formats, consolidating and streamlining data, gaining insights (analytics) from data, and real-time information for automated decision making. In some implementations, and as described in further detail herein, implementations of the present disclosure address such challenges and provide a low cost plug-in solution to effectively consolidate data from a plethora of data sources, integrate digital trends, such as mobility and analytics, for incremental improvement, and provide a roadmap from reactive to proactive to predictive approaches to event handling.

Implementations of the present disclosure will be described in further detail herein with reference to an example context. The example context includes providing real-time views on consolidated data in a public safety setting (e.g., crime, fire, natural disaster). For example, implementations of the present disclosure can be used to support a public safety organization (PSO) (e.g., police department, fire department, first responders) in performing public safety activities. It is contemplated, however, that implementations of the present disclosure can be realized in any appropriate context.

FIG. 1 depicts an example system 100 that can execute implementations of the present disclosure. The example system 100 includes computing devices 102, 104, 106, 107, a back-end system 108, and a network 110. In some examples, the network 110 includes a local area network (LAN), wide area network (WAN), the Internet, or a combination thereof, and connects web sites, devices (e.g., the computing device 102, 104, 106, 107), and back-end systems (e.g., the back-end system 108). In some examples, the network 110 can be accessed over a wired and/or a wireless communications link. For example, mobile computing devices, such as smartphones can utilize a cellular network to access the network 110.

In the depicted example, the back-end system 108 includes at least one server system 112, and data store 114 (e.g., database and knowledge graph structure). In some examples, the at least one server system 112 hosts one or more computer-implemented services that users can interact with using computing devices. For example, the server system 112 can host a computer-implemented service for providing real-time views on consolidated data in accordance with implementations of the present disclosure.

In some examples, the computing devices 102, 104, 106, 107 can each include any appropriate type of computing device such as a desktop computer, a laptop computer, a handheld computer, a tablet computer, a personal digital assistant (PDA), a cellular telephone, a network appliance, a camera, a smart phone, an enhanced general packet radio service (EGPRS) mobile phone, a media player, a navigation device, an email device, a game console, or an appropriate combination of any two or more of these devices or other data processing devices.

In the depicted example, the computing devices 102, 104, 106, 107 are used by users 120, 122, 124, 126, respectively. In accordance with the example context, the users 102, 104 operate at a command and control center of a PSO, where the computing devices 102, 104 provide access to, and real-time views on consolidated data. In the depicted example, the user 124 is an agent of the PSO (e.g., a police officer) that is monitoring and/or responding to events in a locale (e.g., city). In the depicted example, and the user 126 is a citizen that is present in the locale, any may observe and provide information regarding events occurring in the locale.

Data can be provided from a plurality of data sources. In the depicted example, a camera 130 (e.g., CCTV camera), and a vehicle 132 (e.g., a firetruck). In some examples, the camera 130 provides digital images and/or digital video to the back-end system 108, which can process the digital images and/or digital video in hand with other data to provide the real-time views on consolidated data, as described herein. In some examples, the vehicle 132 provides data (e.g., location data indicating a location of the vehicle) to the back-end system 108, which can process the data in hand with other data (e.g., digital images and/or digital video) to provide the real-time views on consolidated data, as described herein.

In some examples, the user 124 can be considered a data source. For example, the user 124 can provide data regarding events to the back-end system 108. In some examples, the user 124 can report an event by calling (e.g., calling 911), and/or through a mobile application executed by the computing device 106. In some examples, the user 124 can provide voice, text, image, and/or video data regarding the event. In some examples, metadata can be provided with the event data. For example, metadata indicating date, time, and/or location can be provided with the event data.

In some examples, the user 126 can be considered a data source. For example, the user 126 can provide data regarding events to the back-end system 108. In some examples, the user 126 can report an event by calling (e.g., calling 911), and/or through a mobile application executed by the computing device 107. In some examples, the user 126 can provide voice, text, image, and/or video data regarding the event. In some examples, metadata can be provided with the event data. For example, metadata indicating date, time, and/or location can be provided with the event data.

In some implementations, data sources can include one or more computer-implemented social networking services. In some examples, users submit posts to social networking services, which posts can include textual, audio, image, and/or video data. In some examples, posts may be relevant to one or more events. For example, witnesses to an event may take to social media to post about what they saw, photographed, and/or recorded. In some examples, posts to social-networking services are publically available. Accordingly, implementations of the present disclosure can submit queries to one or more social networking services through respective application program interfaces (APIs), and can received responses. In some examples, responses include social media posts that were determined to be relevant to a submitted query. In some examples, the platform of the present disclosure processes the social media posts, and can provide data from one or more social media posts as event data. For example, text can be processed using natural language processing (NLP) to determine content of the text, intent, and/or sentiment of the user that published the post. In some examples, a social media post can be the first indicator (e.g. report) of the occurrence of an event (e.g., can be the trigger for an event ticket, described in further detail herein).

In some implementations, the sentiment of a social media post can be used to determine an appropriate response. For example, a user can post that they lost something (e.g., passport, cat, dog), which post can be processed to determine that the scenario the user describes is of lower importance on a criticality scale. In some examples, an automated agent can respond to the user's post and provide instructions on actions the user can take to help resolve the situation (e.g., directions to the nearest police station, hyperlinks to online resources the user can access). As another example, a user can post that they observed danger (e.g., heard gunshots fired), which post can be processed to determine that the scenario the user describes is of higher importance on a criticality scale. In some examples, the automated agent can respond to the user's post and provide instructions on actions the user can take to stay safe in the situation (e.g., stay indoors), and can dispatch help (e.g., police officers). In some implementations, a cognitive learning process is used to learn from event data as it is received, to more accurately determine the content and sentiment.

It is appreciated that the example data sources of FIG. 1, or otherwise described herein, are not exhaustive, and that any appropriate data source can be used in implementations of the present disclosure.

As introduced above, implementations of the present disclosure provide real-time views on consolidated data. In some implementations, the platform of the present disclosure is event-driven, and provides real-time views on consolidated data associated with the event. An example event can include an emergency (e.g., crime, accident).

In some implementations, an event is reported to the platform from one or more data sources. For example, a user (e.g., the user 126) can report an occurrence of an event (e.g., call-into a POS, report using a mobile application). For example, the user can provide event data that is first received and indicates the occurrence of the event. In some examples, a user at a command center (e.g., the user 120, 122) can receive event data (e.g., at the computing device 102, 104), and an event ticket can be generated. In some examples, the event ticket provides a timeline of the event from inception to resolution, and aggregates event data from a plurality of sources, as described herein.

In some implementations, event data is accumulated, updated, modified, as more event data is received from the data sources. For example, a first user can dial into the command center (e.g., call 911) and report the occurrence of a theft. An event ticket can be initiated for the event (i.e., the theft), and can include event data that is provided by the first user. A second user can subsequently report the same theft (e.g., the user submits event data using a mobile application). Event data provided by the second user can be cross-reference with event data provided in a plurality of event tickets, to determine that the event data provided by the second user is associated with the event ticket initiated for the event initially reported by the first user (e.g., the first user and the second user are reporting the same event). In some examples, the event data provided by the first user and the second user can be aggregated in the event ticket.

In some implementations, real-time views on the consolidated data captured in an event ticket are generated. As described in further detail herein, the real-time views are provided based on multiple levels of information. Example levels of information include primary information, secondary information, and digital references. In some examples, primary information includes event data describing details of the event. Example primary information can include witness accounts of the event (e.g., from users reporting/observing the event). In some examples, secondary information includes event data retrieved from data sources in response to the occurrence of the event. Example secondary information can include image/video data retrieved from video surveillance cameras at or near a scene of the event, and historical references that are determined to be relevant to the event by an analytical engine, described in further detail herein. In some examples, digital references include information retrieved from online data sources. For example, one or more search queries including keywords representative of the event can be submitted to a search engine to retrieve information that may be relevant to the event (e.g., information that provides context for the event).

In some examples, in response to creation of the event ticket, a user interface can be displayed which textually and/or graphically depicts event data captured in the event ticket in one or more views. In some examples, as additional event data is received, and/or already received event data is updated, the one or more views can be updated in real-time. In accordance with implementations of the present disclosure, real-time describes actions that can be automatically executed, without requiring human input and without any intentional delay, taking into account the processing limitations of the platform hardware and/or software, and any time required to process data.

Continuing with the example above, a first user provides event data to initiate the event ticket, and a second user subsequently provides event data for the same event. For example, the event data provided by the first user indicates that a theft occurred at "Acme Flower Shop," and the suspect is a white male (e.g., primary information). In some examples, in response to the event data provided by the first user, a real-time view is provided, which textually and/or graphically depicts the event. For example, the real-time view can provide the text "Theft," "Acme Flower Shop," and "Suspect white male." In some examples, a search query "Acme Flower Shop," can be automatically submitted to a search engine, and search results can be received. In some examples, the search results can include a location of "Acme Flower Shop," which location can be submitted to a third-party map service (e.g., Google Maps), which provides a map of a location, within which "Acme Flower Shop" is located. In response to receipt of the map, the real-time view can be update to graphically depict the map (e.g., digital reference), in hand with the already depicted event data.

In some implementations, one or more data sources can be queried for secondary information. For example, one or more video surveillance systems can be queried for image/video data based on a location of the event and a time range, within which the event occurred. In some examples, the location can be determined based on reporting of the event, and/or as a digital reference provided from an online resource (e.g., search engine, as described in the example above). For example, a location of a mobile device that a user uses to report the event can be determined (e.g., from GPS signals, wifi signals, cellular tower triangulation), and a first query can be submitted to a video surveillance system requesting identifiers of all video cameras within a predetermined radius of the locations. A second query can be submitted requesting image/video data from each camera identified from the first query, and within a predetermined time range (e.g., +/−1 hour of the time of the event occurring). In some implementations, the image/video data can be processed to update the real-time view(s). For example, a real-time view can be updated to include an image of the suspect.

In some implementations, the real-time view(s) can be provided to one or more responders. For example, one or more available responders can be determined based on respective proximities to the location of the event. In some examples, a list of on-duty officers, for example, can be provided, along with a location of each on-duty officer. For example, a location of an on-duty officer can be determined based on a computing device that the on-duty officer holds on their person (e.g., from GPS signals, wifi signals, cellular tower triangulation). In some examples, the location of an on-duty officer can be compared to a location of the event, and, if the on-duty officer is within a threshold distance (e.g., 3 kilometers), the on-duty officer can be included in a set of available responders. In some implementations, radial search is used to identify available responders. In some examples, the real-time view is transmitted to each available responder in the set of available responders, and is updated in real-time as additional event data is received. For example, the real-time view is transmitted to a computing device (e.g., smartphone, wearable device) of the responder for display to the responder.

In some implementations, the available responder can select an event from the real-time view (e.g., can click-on the pin-drop location depicted on a map). In some examples, in response to user selection of the event, event data can be displayed to the available responder. For example, the multiple layers of information, described above, can be displayed to the available responder. In some examples, and as described above, the real-time view is updated in real-time as additional, updated, edited event data is received.

In some implementations, citizens can register to receive real-time views on consolidated data associated with events. For example, implementations of the present disclosure include a computer-implemented citizen connection service (referred to herein as Citizen Konnect) that provides data views to users (e.g., citizens) to enable the user to make more informed decisions regarding safety, for example. In some examples, a user can download and install a mobile application to a computing device. The mobile application can execute on the computing device and can receive data views (e.g., from a command and control center) for display to the user. In some examples, radial search can be used to determine which events to display on which user devices. For example, it can be determined that any user within a threshold radius of an event receives a data view on their computing device. In some implementations, the computer-implemented citizen connection service enables users to submit event data (e.g., if they witness, or otherwise have information relevant to an event).

In some implementations, users can indicate their location using a computer-implemented service (e.g., the computer-implemented citizen connection service). In some examples, users can "check-in" or "tag" their location to publicly broadcast their presence at a particular location. In some implementations, a criticality of an event can be adjusted at least partially based on users that are proximate to a location of the event. For example, a first event is reported and reflects a violent crime, and a second event is reported and reflects a violent crime. Based on user locations (e.g., check-ins, tags), it can be determined that there is a larger population of users in proximity to the second event than are in proximity to the first event. In response, the second event can be assigned a higher priority for resolution than the first event. For example, more officers are sent to respond to the second event than are sent to respond to the first event.

Figure 2:
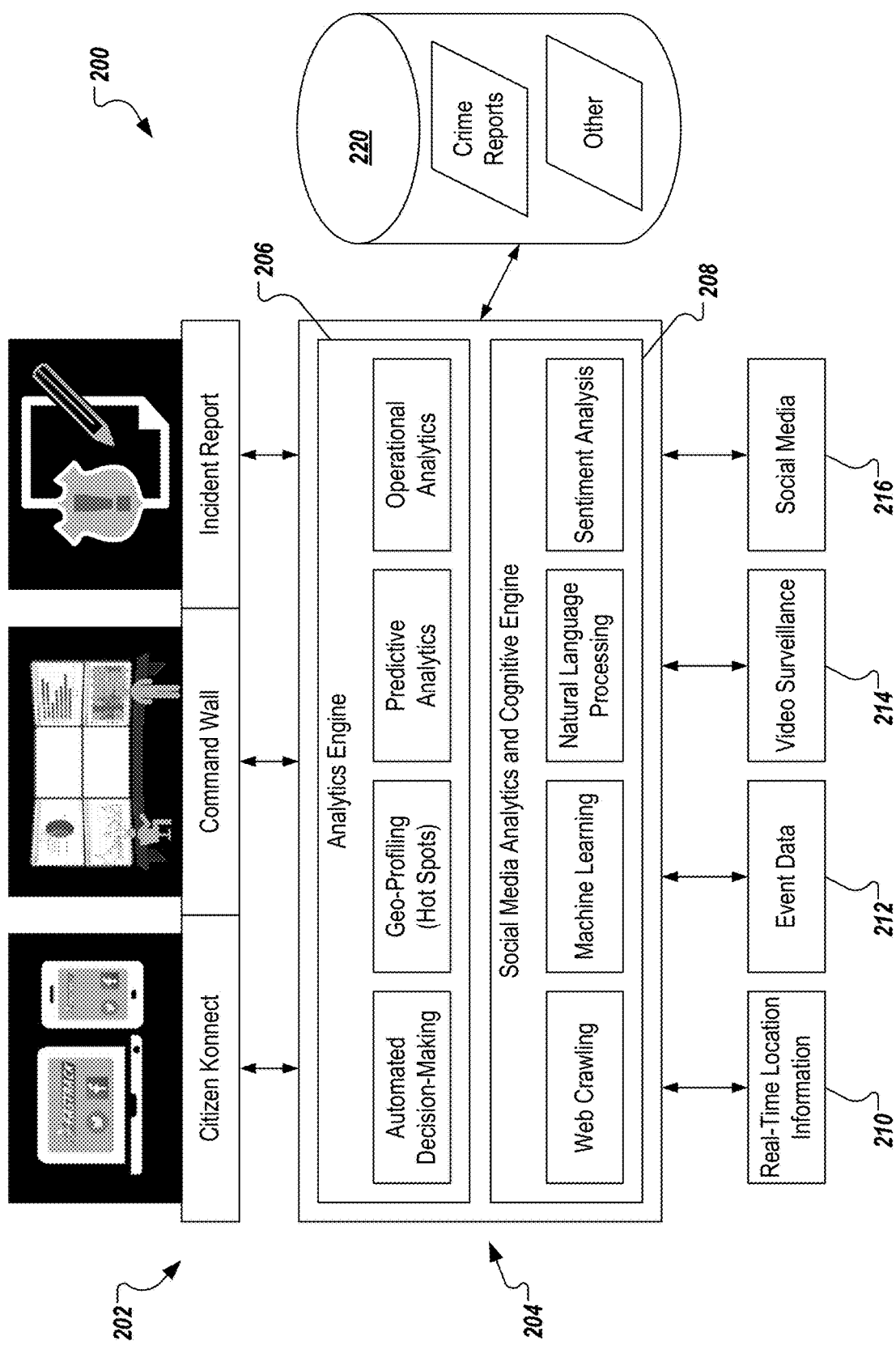
FIG. 2 schematically depicts an example platform in accordance with implementations of the present disclosure.

FIG. 2 schematically depicts an example platform 200 in accordance with implementations of the present disclosure. The example platform 200 includes a suite of command and control applications 202, and an analytics platform 204. In some examples, the suite of command and control applications 202 includes a plurality of computer-executable applications that are executed on computing devices of respective users (e.g., actors, such as police officers, dispatchers) of the PSO. For example, an application can be executed by the computing devices 102, 104 of FIG. 1 to provide access to real-time visual and location-based information. In some examples, other information is provided. For example, performance analysis and cost of ownership information can be provided. In some implementations, the analytics platform 204 includes a data analytics component 206, and a social media analytics component 208. In some examples, the analytics platform 204 receives data from a plurality of data sources. Example data includes real-time location information 210 (e.g., location-based device data), event data 212, surveillance data 214, and social media data 216. Example event data 212 includes information associated with a reported event, such as information provided by a citizen (e.g., called into 911), and/or an actor (e.g., reported by an officer/first responder). For example, a citizen can report an event by contacting (e.g., calling, emailing) the PSO and can provide event information, such as type (e.g., fire, theft, violence), location, time, suspect, and the like. Example surveillance data 214 includes data obtained from one or more surveillance devices (e.g., video cameras, microphones, drones, body-worn cameras). Example social media data 216 includes data provided through one or more computer-implemented social networking services (e.g., textual posts, video, images).

In some implementations, and as described herein, the analytics platform 204 processes the real-time location information 210, the event data 212, surveillance data 214, and social media data 216 to provide real-time data and consolidated views on an event. In some examples, an iterative process of analyzing and assessing, taking action, monitoring and reviewing, and discovery is performed.

In some implementations, the example platform 200 also includes one or more external databases 220. In the depicted example, one or more external databases can provide crime reports (e.g., historical crime data), and/or other data that may be relevant to ongoing events.

Figure 3:
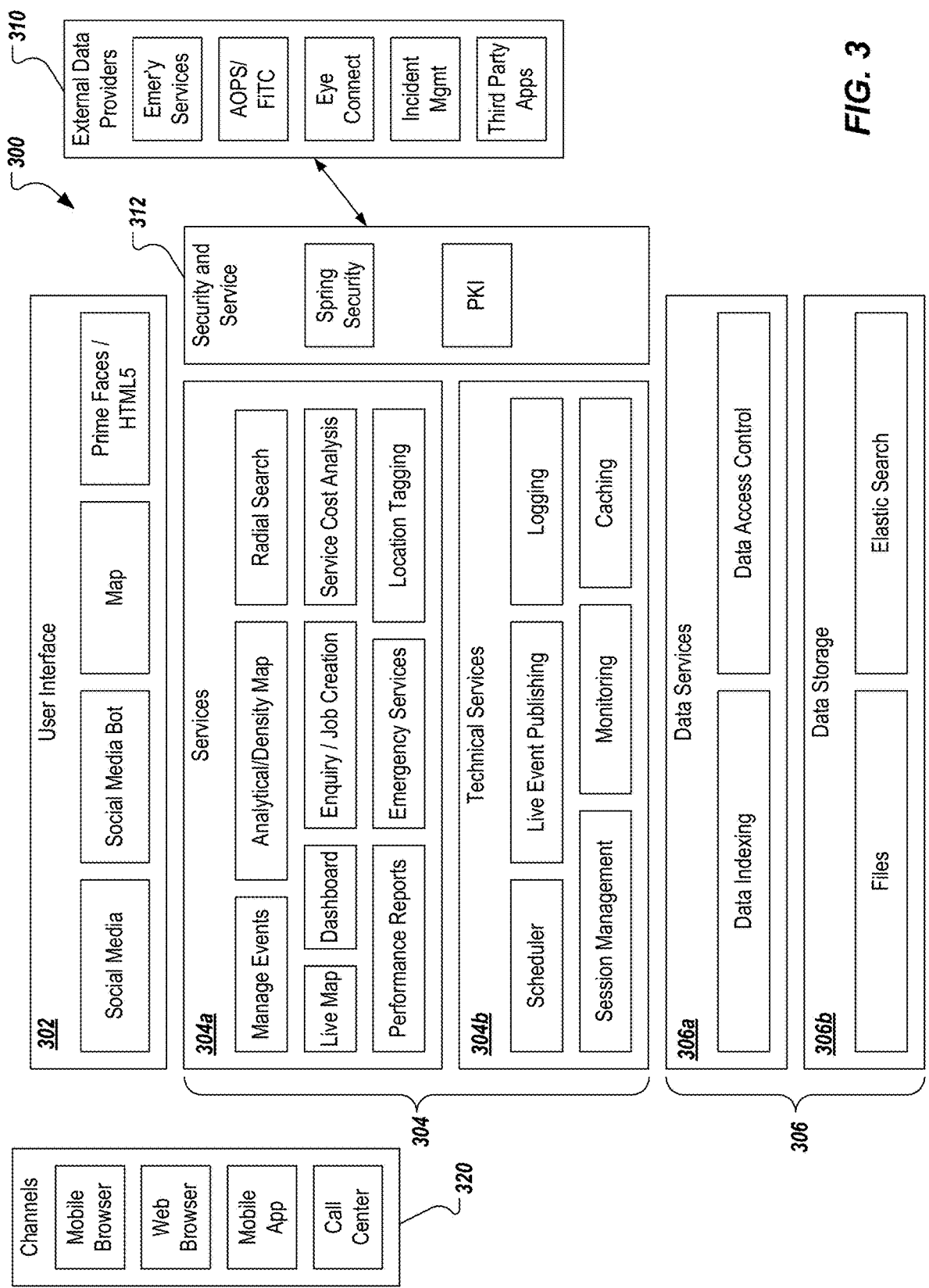
FIG. 3 depicts example layers in accordance with implementations of the present disclosure.

FIG. 3 depicts example layers 300 in accordance with implementations of the present disclosure. The example layers 300 include a presentation layer 302 (user interface (UI) layer), a service layer 304, and a data services layer 306. In some examples, a user (e.g., the user 120, 122 of FIG. 1) interacts with the presentation layer 302 to access data (e.g., using the computing device 102, 104 of FIG. 1). In some implementations, the presentation layer 302 includes a plurality of components (e.g., user interface(s), mapping service(s), dashboard(s), social media interfaces). In some examples, the components are provided as Java-Server Faces (JSF) components. In some implementations, the presentation layer 302 interacts with the service layer 304 through a request controller. In some examples, the request controller is provided as a servlet a servlet that manages the request processing lifecycle for web applications that are being used to construct the components of the presentation layer 302. An example request controller includes the Java FacesServlet.

In some implementations, the service layer 304 provides access to one or more web-based services (e.g., web services, social networking services), and the data services layer 306. In some examples, the service layer 304 provides access to a social media crawling system. For example, the social media crawling system can access data of one or more computer-implemented social networking services to retrieve social media data that might be relevant to an event (e.g., users posting about a crime that is occurring/occurred). In some examples, the service layer 304 includes services 304 *a*, and technical services 304*b*. In some examples, components of the service layer 304 interact (e.g., make calls to, receive responses from) one or more external data providers 310. In the depicted example, security and service components 312 enable secure communication between the service layer 304, and the one or more external data providers 310.

In some implementations, the data services layer 306 provides access to a search engine including an elastic search application program interface (API) and one or more search indices. In some examples, the data services layer 306 receives a query from the service layer 304, and processes the query to provide a result. In the depicted example, the data services layer 306 includes data services 306*a* (e.g., data indexing, data access control), and data storage 306*b* (e.g., file storage, elastic search).

Further, and as introduced above, users can interact with the example layers through one or more channels 320. For example, a UI of the presentations layer 302 can be displayed to a user on a device through a channel. Example channels include a mobile browser (e.g., a mobile web browser executed on a mobile device), a web browser (e.g., a web browser executed on a computing device), a mobile application (e.g., a mobile app executed on a mobile device), and a call center (e.g., one or more computer-executable programs executed on computing devices of a call center).

Figure 4:
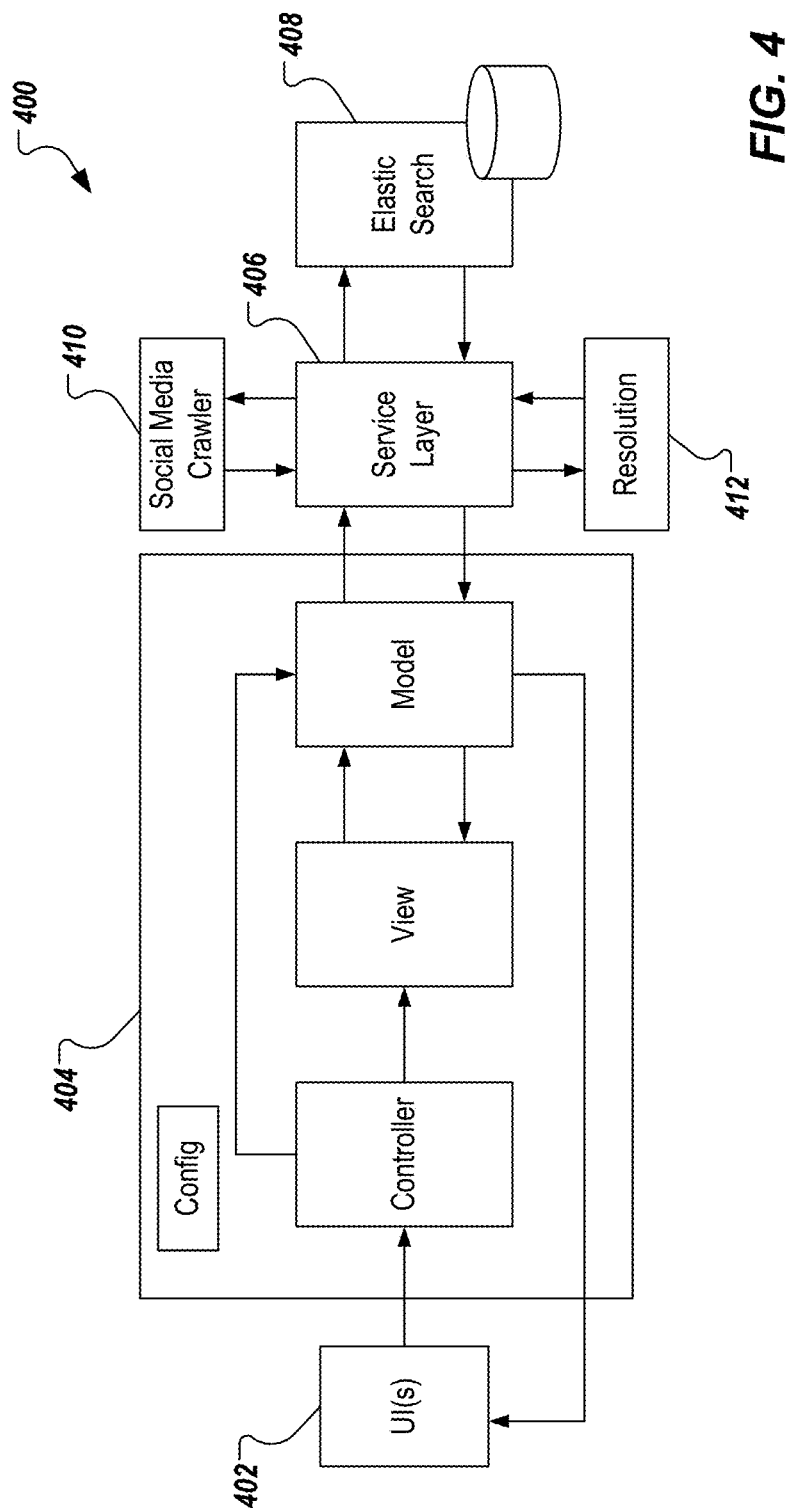
FIG. 4 depicts an example module architecture in accordance with implementations of the present disclosure.

FIG. 4 depicts an example module architecture 400 in accordance with implementations of the present disclosure. The example module architecture 400 includes a front-end module 402, a web application module 404, a service layer module 406, and a data services module 408. In some examples, the modules correspond to one or more layers of the example layers of FIG. 3. In some examples, each module is provided as one or more computer-executable programs executed by one or more computing devices.

In some implementations, the front-end module 402 provides one or more user interfaces for real-time views on consolidated data, as well as enabling user interaction (e.g., requesting data, views, etc.) with other modules. For example, the front-end module 402 (or multiple front-end modules 402) can be executed on one or more computing devices (e.g., computing devices 102, 104). In some implementations, the web application module 404 interacts with underlying layers in response to user input (e.g., provided through the front-end module 402) to provide one or more views to the front-end module 402, which views can be displayed to users.

In the depicted example, the web application module 404 includes a controller sub-module, a view sub-module, and a model sub-module. In some examples, the controller module is provided as a Java FacesServlet, the view module is provided as one or more JSF components, and the model module includes managed beans and data classes.

In some implementations, the service layer module 406 interacts with one or more services. In the depicted example, example services include an elastic search service 408, a social media crawler service 410, and resolution services 412. In some examples, resolution services 412 can be provided by one or more third-party service provides, and can assist in (e.g., make recommendations) tasks for resolving events. In some examples, the service layer module 406 receives a request from the web application module 404, and processes the request to provide a response. In some examples, and in response to the request, the service layer module 406 transmits one or more requests to one or more web services, and/or the data services module 408. In some examples, each of the web services, and/or the data services module 408 provides a response to the data services module 406, which consolidates the responses to provide a response to the web application module 404. The web application module 404 processes the response to provide one or more views to the front-end module 402.

Figure 5:
FIGS. 5 and 6 respectively depict views in accordance with implementations of the present disclosure.
Figure 6:
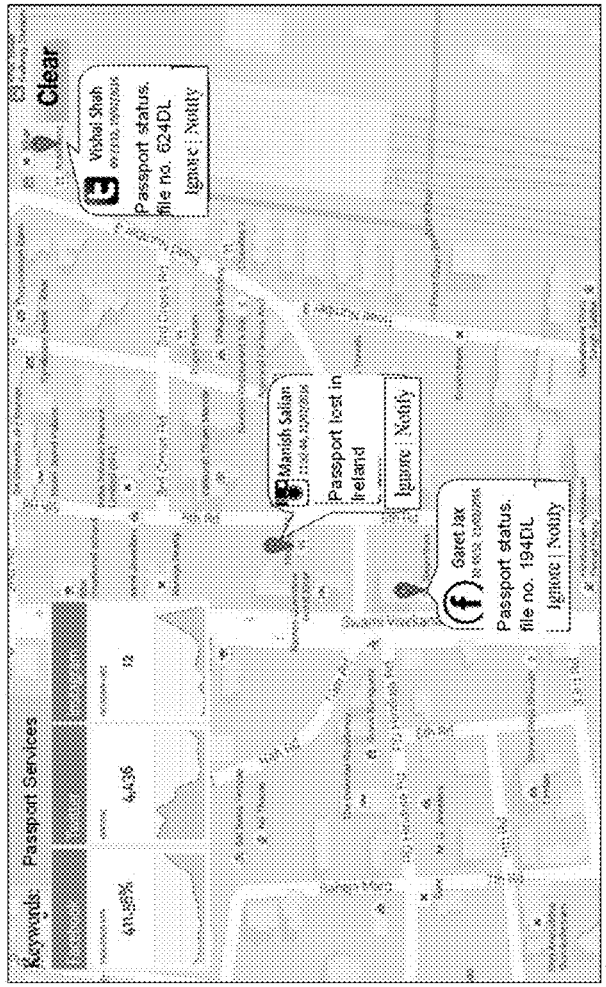

FIGS. 5 and 6 respectively depict example views 500, 600 in accordance with implementations of the present disclosure.

With particular reference to FIG. 5, a real-time, situational view is provided and includes graphical representations of event data associated with one or more events. In some examples, the view 500 of FIG. 5 is an example of a real-time view that can be depicted at a command and control center of a PSO. The example of FIG. 5 depicts multiple events (e.g., fires, accidents), locations of emergency responders (e.g., ambulances, fire trucks, officers), and locations of video surveillance systems.

With particular reference to FIG. 6, depicts an example data view that can be provided to users using the computer-implemented citizen connection service described herein. In the depicted example, the data view incorporates social media data regarding incidences reported by other citizens.

The example views described above are not exhaustive. It is contemplated that any appropriate views can be provided. In some examples, one or more databases can be searched based in one or more search parameters to provide a resultant data set. For example, the resulting data set can indicate locations of events that have occurred (e.g., thefts, accidents, fires), which locations can be graphically depicted on a map. In some examples, the locations can be filtered based on event type (e.g., a filter can be applied, such that locations of only thefts are displayed). In some examples, a heat map can be provided, which graphically depicts densities of occurrences of events. In this manner, insights and trends can be derived from the presented data.

In some implementations, views on performance data can be provided. For example, statistics on resolution of events can be determined, and can be graphically depicted in one or more graphs. An example statistic can include the time required to respond to and/or resolve particular types of events (e.g., burglaries, assaults, auto accidents), which statistics can be displayed in graphical form (e.g., bar graphs). In some examples, statistics on timing of occurrences of events can be determined, and can be graphically depicted in one or more graphs. For example, for each type of event times and days of occurrences of events can be determined, and a heat map can be provided based on the times and days of occurrences. In this manner, trends in occurrences of events can be determined. For example, the heat map can indicate that thefts most commonly occur on Thursday evening between 18:00-22:00, and rarely occur Mondays through Wednesdays from 00:00-11:00.

Figure 7:
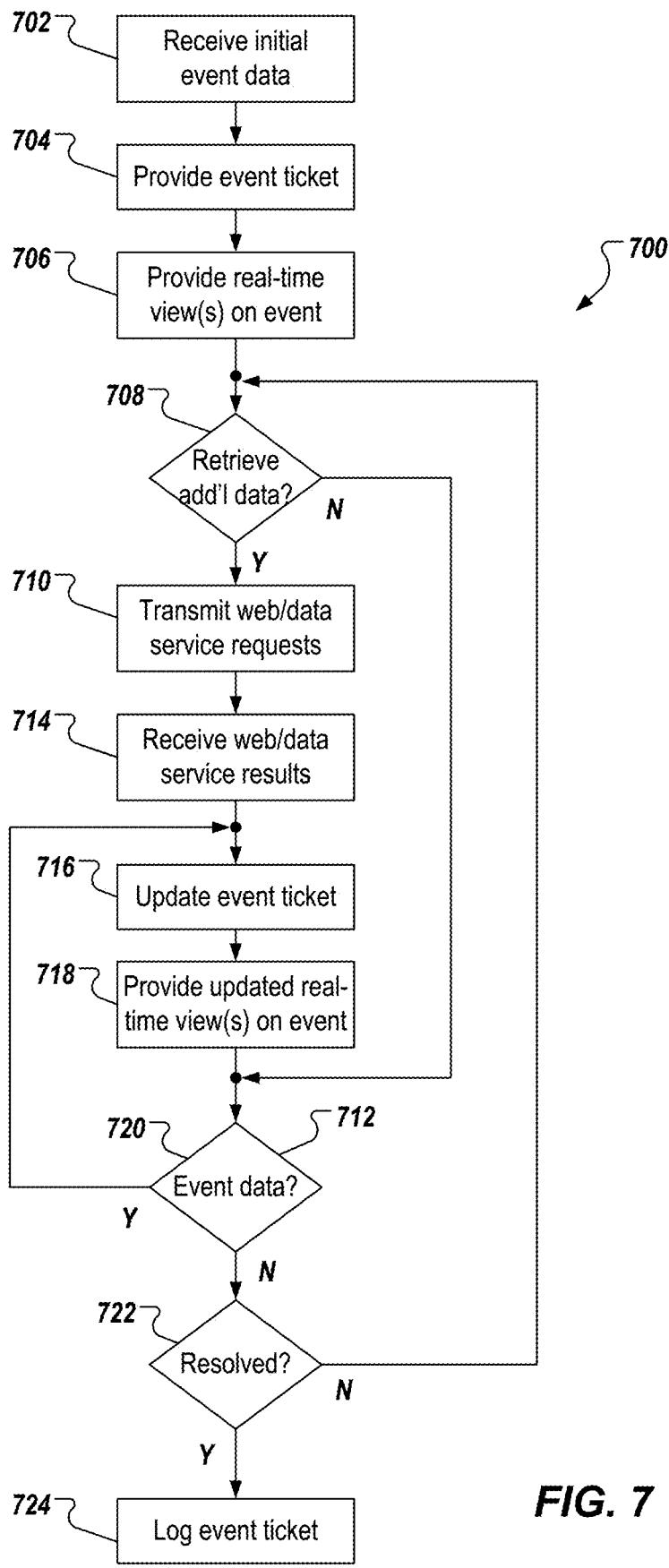
FIG. 7 depicts an example process that can be executed in implementations of the present disclosure.

FIG. 7 depicts an example process 700 that can be executed in implementations of the present disclosure. In some examples, the example process 700 is provided using one or more computer-executable programs executed by one or more computing devices (e.g., the back-end system 108 of FIG. 1). The example process 700 can be executed to provide real-time views on consolidated data in accordance with implementations of the present disclosure.

Initial event data is received (702). For example, an initial event data set can be received by a platform (e.g., executed by the back-end system 108 of FIG. 1). In some examples, the initial event data is received from a data source (e.g., a witness/victim to/of an event contacts a PSO). In some examples, the initial event data is the first indication (to the platform) that a real-world event (e.g., crime, accident, natural disaster) has occurred, and includes data that is at least partially descriptive of the real-world event. An event ticket is provided (704). In some examples, an event ticket is provided as a data structure that holds event data. In some examples, the event ticket is provided from an event ticket template that is populated based on received data. In some examples, the event ticket can be assigned a unique identifier, which uniquely identifies the event ticket among a plurality of event tickets. In some examples, an event ticket template is selected from a plurality of event ticket templates based on an event type. For example, if the event type is a crime, a crime template event ticket is selected, while, if the event type is an accident, an accident template event ticket is selected. In some examples, data fields within an event ticket are provided based on the type of event. For example, a crime template event ticket can include one or more data fields directed to suspect(s), while an accident template event ticket may be absent data fields directed to suspect(s).

One or more real-time views of the event are provided (706). For example, the event ticket (e.g., data recorded therein) is processed to provide presentation data. In some examples, the presentation data is descriptive of text, image(s), video(s), and/or audio that is to be provided in the one or more real-time views. In some examples, the presentation data is transmitted to one or more computing devices, and is processable by the one or more computing devices to display a real-time view that includes one or more graphical representations representative of the real-world event. For example, the presentation data can be transmitted to the computing device 106 to display a real-time view to the user 124 (e.g., a responder), improving a situational awareness of the responder with respect to the event.

It is determined whether additional data is to be retrieved (708). For example, it can be determined whether web services and/or data services are to be queried for event data regarding the event. If additional data is not to be retrieved, it is determined whether subsequent event data has been received (712). If additional data is to be retrieved, one or more requests are respectively transmitted to one or more web services, and/or one or more data services (710), as described herein. One or more responses are respectively received from the one or more web services, and/or the one or more data services (710), as described herein.

The event ticket is updated (716). For example, the event ticket is updated based on event data received from one or more data sources (e.g., web service(s), data service(s)). In some examples, the event ticket is updated by populating data fields that are absent values with values from the received event data. In some examples, the event ticket is updated by modifying values in a data field in view of values from the received event data. The one or more real-time views are updated to provide updated real-time views of the event (718). For example, the updated event ticket (e.g., data recorded therein) is processed to provide updated presentation data, which is transmitted to the one or more computing devices.

It is determined whether subsequent event data has been received (712). For example, subsequent event data can be received from a data source (e.g., a witness/responder/victim to/of an event contacts a PSO). In some examples, the subsequent event data is a subsequent indication (to the platform) of the already reported, real-world event (e.g., crime, accident, natural disaster), and includes data that is at least partially descriptive of the real-world event. If subsequent event data has been received, the example process 700 loops back to update the event ticket (716) and update the real-time view(s) (718). If subsequent event data has not been received, it is determined whether the event has been resolved (722). For example, it can be determined that the event has been resolved and is no longer occurring (e.g., the suspect has been caught). If the event has not been resolved, the example process 700 loops back. If the event has been resolved, the event ticket is logged (724).

Implementations and all of the functional operations described in this specification may be realized in digital electronic circuitry, or in computer software, firmware, or hardware, including the structures disclosed in this specification and their structural equivalents, or in combinations of one or more of them. Implementations may be realized as one or more computer program products, i.e., one or more modules of computer program instructions encoded on a computer readable medium for execution by, or to control the operation of, data processing apparatus. The computer readable medium may be a machine-readable storage device, a machine-readable storage substrate, a memory device, a composition of matter effecting a machine-readable propagated signal, or a combination of one or more of them. The term "computing system" encompasses all apparatus, devices, and machines for processing data, including by way of example a programmable processor, a computer, or multiple processors or computers. The apparatus may include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal that is generated to encode information for transmission to suitable receiver apparatus.

A computer program (also known as a program, software, software application, script, or code) may be written in any appropriate form of programming language, including compiled or interpreted languages, and it may be deployed in any appropriate form, including as a stand alone program or as a module, component, subroutine, or other unit suitable for use in a computing environment. A computer program does not necessarily correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one computer or on multiple computers that are located at one site or distributed across multiple sites and interconnected by a communication network.

The processes and logic flows described in this specification may be performed by one or more programmable processors executing one or more computer programs to perform functions by operating on input data and generating output. The processes and logic flows may also be performed by, and apparatus may also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any appropriate kind of digital computer. Generally, a processor will receive instructions and data from a read only memory or a random access memory or both. Elements of a computer can include a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer may be embedded in another device, e.g., a mobile telephone, a personal digital assistant (PDA), a mobile audio player, a Global Positioning System (GPS) receiver, to name just a few. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory may be supplemented by, or incorporated in, special purpose logic circuitry.

To provide for interaction with a user, implementations may be realized on a computer having a display device, e.g., a CRT (cathode ray tube) or LCD (liquid crystal display) monitor, for displaying information to the user and a keyboard and a pointing device, e.g., a mouse or a trackball, by which the user may provide input to the computer. Other kinds of devices may be used to provide for interaction with a user as well; for example, feedback provided to the user may be any appropriate form of sensory feedback, e.g., visual feedback, auditory feedback, or tactile feedback; and input from the user may be received in any appropriate form, including acoustic, speech, or tactile input.

Implementations may be realized in a computing system that includes a back end component, e.g., as a data server, or that includes a middleware component, e.g., an application server, or that includes a front end component, e.g., a client computer having a graphical user interface or a Web browser through which a user may interact with an implementation, or any appropriate combination of one or more such back end, middleware, or front end components. The components of the system may be interconnected by any appropriate form or medium of digital data communication (e.g., a communication network). Examples of communication networks include a local area network ("LAN") and a wide area network ("WAN"), e.g., the Internet.

The computing system may include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of the disclosure or of what may be claimed, but rather as descriptions of features specific to particular implementations. Certain features that are described in this specification in the context of separate implementations may also be implemented in combination in a single implementation. Conversely, various features that are described in the context of a single implementation may also be implemented in multiple implementations separately or in any suitable sub-combination. Moreover, although features may be described above as acting in certain combinations and even initially claimed as such, one or more features from a claimed combination may in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems may generally be integrated together in a single software product or packaged into multiple software products.

A number of implementations have been described. Nevertheless, it will be understood that various modifications may be made without departing from the spirit and scope of the disclosure. For example, various forms of the flows shown above may be used, with steps re-ordered, added, or removed. Accordingly, other implementations are within the scope of the following claims.

What is claimed is:

1. A computer-implemented method for providing real-time views on consolidated data, the method being executed by one or more processors and comprising:
   receiving, by the one or more processors, a first set of event data from a first data source, the first set of data comprising data representative of an occurrence of a real-world event;
   providing, by the one or more processors, an event ticket, the event ticket comprising at least a portion of data of the first set of event data;
   identifying a set of computing devices based on a user-initiated registration of a respective computing device, each computing device in the set of computing devices being associated with a citizen user;
   defining a sub-set of computing devices from the set of computing devices based on proximities of respective computing devices to the real-world event, the proximities each being determined based on location data representative of a location of the of the real-world event and location data representative of a respective locations of a respective computing device in the set of computing devices;
   setting a criticality of the event based on one or more sentiments determined from social media posts relevant to the event and adjusting the criticality based on a population of users in the sub-set of users, a cognitive learning process being used to learn from event data as the event data is received to more accurately determine the one or more sentiments, a priority of the event being higher than a priority of another event based on the criticality, such that a first number of responders sent to respond to the event is greater than a second number of responders sent to respond to the another event;
   transmitting, by the one or more processors, presentation data to computing devices in the sub-set of computing devices, the presentation data being based on the event ticket and being processable by the computing devices to display a real-time view comprising one or more graphical representations representative of the real-world event;
   receiving, by the one or more processors, a second set of event data from a second data source, the second set of event data comprising data associated with the real-world event;
   revising, by the one or more processors, the event ticket to include at least a portion of data of the second set of event data to provide a revised event ticket; and
   transmitting, by the one or more processors, revised presentation data to the computing devices, the revised presentation data being based on the revised event ticket and being processable by the computing devices to display a revised real-time view.

2. The method of claim 1, wherein the second data source comprises at least one of a web service, a data service, a computer-implemented social networking service, and a search engine.

3. The method of claim 1, wherein the second data source comprises a computing device of a user, the computing device executing at least a portion of a computer-implemented citizen connection service.

4. The method of claim 1, further comprising transmitting at least a portion of the presentation data to a computing device of a responder that is being called to respond to the event.

5. The method of claim 1, wherein the real-time view depicts a map indicating the location of the real-world event, and at least one of a location of one or more responders to the real-world event, and a location of a witness that reported the real-world event.

6. One or more non-transitory computer-readable storage media coupled to one or more processors and having instructions stored thereon which, when executed by the one or more processors, cause the one or more processors to perform operations for providing real-time views on consolidated data, the operations comprising:
   receiving, by the one or more processors, a first set of event data from a first data source, the first set of data comprising data representative of an occurrence of a real-world event;
   providing, by the one or more processors, an event ticket, the event ticket comprising at least a portion of data of the first set of event data;
   identifying a set of computing devices based on a user-initiated registration of a respective computing device, each computing device in the set of computing devices being associated with a citizen user;
   defining a sub-set of computing devices from the set of computing devices based on proximities of respective computing devices to the real-world event, the proximities each being determined based on location data representative of a location of the of the real-world event and location data representative of a respective locations of a respective computing device in the set of computing devices;
   setting a criticality of the event based on one or more sentiments determined from social media posts relevant to the event and adjusting the criticality based on a population of users in the sub-set of users, a cognitive learning process being used to learn from event data as the event data is received to more accurately determine the one or more sentiments, a priority of the event being higher than a priority of another event based on the criticality, such that a first number of responders sent to respond to the event is greater than a second number of responders sent to respond to the another event;
   transmitting, by the one or more processors, presentation data to computing devices in the sub-set of computing devices, the presentation data being based on the event ticket and being processable by the computing devices to display a real-time view comprising one or more graphical representations representative of the real-world event;
   receiving, by the one or more processors, a second set of event data from a second data source, the second set of event data comprising data associated with the real-world event;
   revising, by the one or more processors, the event ticket to include at least a portion of data of the second set of event data to provide a revised event ticket; and
   transmitting, by the one or more processors, revised presentation data to the computing devices, the revised presentation data being based on the revised event ticket and being processable by the computing devices to display a revised real-time view.

7. The computer-readable storage media of claim 6, wherein the second data source comprises at least one of a web service, a data service, a computer-implemented social networking service, and a search engine.

8. The computer-readable storage media of claim 6, wherein the second data source comprises a computing device of a user, the computing device executing at least a portion of a computer-implemented citizen connection service.

9. The computer-readable storage media of claim 6, wherein the operations further comprise transmitting at least a portion of the presentation data to a computing device of a responder that is being called to respond to the event.

10. The computer-readable storage media of claim 6, wherein the real-time view depicts a map indicating the location of the real-world event, and at least one of a location of one or more responders to the real-world event, and a location of a witness that reported the real-world event.

11. A system, comprising:
one or more processors; and
a computer-readable storage device coupled to the one or more processors and having instructions stored thereon which, when executed by the one or more processors, cause the one or more processors to perform operations for providing real-time views on consolidated data, the operations comprising:
receiving a first set of event data from a first data source, the first set of data comprising data representative of an occurrence of a real-world event;
providing an event ticket, the event ticket comprising at least a portion of data of the first set of event data;
identifying a set of computing devices based on a user-initiated registration of a respective computing device, each computing device in the set of computing devices being associated with a citizen user;
defining a sub-set of computing devices from the set of computing devices based on proximities of respective computing devices to the real-world event, the proximities each being determined based on location data representative of a location of the of the real-world event and location data representative of a respective locations of a respective computing device in the set of computing devices;
setting a criticality of the event based on one or more sentiments determined from social media posts relevant to the event and adjusting the criticality based on a population of users in the sub-set of users, a cognitive learning process being used to learn from event data as the event data is received to more accurately determine the one or more sentiments, a priority of the event being higher than a priority of another event based on the criticality, such that a first number of responders sent to respond to the event is greater than a second number of responders sent to respond to the another event;
transmitting presentation data to computing devices in the sub-set of computing devices, the presentation data being based on the event ticket and being processable by the computing devices to display a real-time view comprising one or more graphical representations representative of the real-world event;
receiving a second set of event data from a second data source, the second set of event data comprising data associated with the real-world event;
revising the event ticket to include at least a portion of data of the second set of event data to provide a revised event ticket; and
transmitting revised presentation data to the computing devices, the revised presentation data being based on the revised event ticket and being processable by the computing devices to display a revised real-time view.

12. The system of claim 11, wherein the second data source comprises at least one of a web service, a data service, a computer-implemented social networking service, and a search engine.

13. The system of claim 11, wherein the second data source comprises a computing device of a user, the computing device executing at least a portion of a computer-implemented citizen connection service.

14. The system of claim 11, wherein the operations further comprise transmitting at least a portion of the presentation data to a computing device of a responder that is being called to respond to the event.

15. The system of claim 11, wherein the real-time view depicts a map indicating the location of the real-world event, and at least one of a location of one or more responders to the real-world event, and a location of a witness that reported the real-world event.

* * * * *